United States Patent [19]

Bowen et al.

[11] 3,961,829

[45] June 8, 1976

[54] IMPROVEMENTS IN OR RELATING TO RESILIENT MOUNTINGS

[75] Inventors: Gwynne Bowen, Leicester; Alan Frederick Moore, Burbage, both of England

[73] Assignee: Dunlop Limited, London, England

[22] Filed: Sept. 11, 1973

[21] Appl. No.: 396,144

[30] Foreign Application Priority Data

Sept. 20, 1972 United Kingdom............... 43528/74
May 5, 1973 United Kingdom............... 21521/74

[52] U.S. Cl..................................... 308/28; 248/7; 248/26; 308/36.1; 308/184 R
[51] Int. Cl.²........................................ F16C 35/12
[58] Field of Search............. 308/26, 27, 28, 184 R, 308/36.1, 78, 184; 248/26, 7

[56] References Cited
UNITED STATES PATENTS

| | | | |
|---|---|---|---|
| 2,933,354 | 4/1960 | Primeau | 308/184 R |
| 3,097,026 | 7/1963 | Sernetz | 308/184 R |
| 3,580,532 | 5/1971 | Schmitt | 248/26 X |
| 3,586,402 | 6/1971 | Howe, Jr. | 308/184 R |
| 3,639,015 | 2/1972 | Maas | 308/184 X;184 |
| 3,704,922 | 12/1972 | Kleinschmidt et al. | 308/184 R X |

FOREIGN PATENTS OR APPLICATIONS

| | | | |
|---|---|---|---|
| 956,739 | 4/1964 | United Kingdom | 308/26 |
| 921,720 | 3/1963 | United Kingdom | 308/184 |

*Primary Examiner*—Frank E. Werner
*Assistant Examiner*—Randolph A. Reese
*Attorney, Agent, or Firm*—Stevens, Davis, Miller & Mosher

[57] ABSTRACT

A resilient mounting comprising an outer rigid member formed with an aperture in which is situated an inner rigid member, a deformable first annular element extending between the inner and outer rigid members, and a second annular element being located between the inner and outer rigid members, the first annular element being formed of a material having a resilience different from that of the material of the second annular element. The mounting is particularly applicable as a support for the center bearing of a vehicle propeller shaft, of which the following is a specification.

27 Claims, 6 Drawing Figures

IMPROVEMENTS IN OR RELATING TO RESILIENT MOUNTINGS

This invention relates to resilient mountings and in particular, though not exclusively, to resilient bushes.

The invention is particularly applicable to resilient bushes for supporting the center bearing of a divided propeller shaft of a motor vehicle. Conventional resilient bushes for use in this application commonly comprise inner and outer tubular members and an elastomeric element located therebetween such that relative radial movement between the bushes is provided for by the elastomeric element undergoing compression and extension. The bush is thereby able to dampen vibrations of the propeller shaft and attenuate the transmission of the vibrations to the body of the motor vehicle.

One object of the present invention is to provide an improved resilient mounting.

According to one aspect of the present invention a resilient mounting comprises an outer rigid member formed with an aperture in which is situated an inner rigid member, a deformable first annular element extending between said inner and outer rigid members, and a second annular element being located between said inner and outer rigid members, the first annular element being formed of a material having a resilience different from that of the material of the second annular element.

Preferably the second annular element is secured to one only of said inner and outer rigid member leaving a gap between itself and the the others, the arrangement of the members and elements being such that the second annular element is subjected to deformation under relative radial movement between the inner and outer rigid members of only more than a predetermined magnitude.

Alternatively, where the second annular element is formed from an elastomeric material, it may be arranged to extend between the inner and outer rigid members leaving no gap, and in this arrangement preferably the second annular element is formed from a foam material.

Preferably the first annular element is arranged such that relative radial movement between the inner and outer rigid members is accommodated for by a shearing and bending action by the material of the said element, and preferably the first annular element is bonded to either of or both the inner and outer rigid members.

The first annular element may be of a substantially V-shape axial cross-sectional form and preferably is disposed between the rigid members such that the two limb portions of the cross-sectional shape extend substantially parallel with the direction of the longitudinal axis of the annular element, and at least one of the two portions may be in contact with a rigid member only over that area of the limb portion substantially remote from an apex region at the junction of the two limb portions. Preferably the deformable first annular element is formed from an elastomeric material.

Preferably the second annular element is in the form of an annular buffer ring located between the limb portions of the first annular element, concentrically therewith and attached to one of said limb portions so as to prevent facing surfaces of the inner and outer limb portions being urged wholly into contact during relative radial movement between the inner and outer rigid members. The buffer ring may be bonded to one of the limb portions or may be attached thereto by other means such as, for example, by friction grip or by adhesives.

Alternatively, while being secured relative to one of the rigid members, the buffer ring may also be formed independent of the elastomeric first annular element.

According to a further aspect of the present invention the deformable first annular element is formed such that the longitudinal axes of the inner and outer rigid members are off-set when said first element is in an unloaded condition.

Preferably the extent of the off-set is selected such that when a static load acts on the inner rigid member due to the weight of a component, for example a divided propeller shaft, supported by the inner member, the inner member adopts the desired resultant position, either coaxial or off-set, relative to the other member and the invention also includes a shaft assembly including a resilient mounting as described.

The buffer ring may be secured to the radially inner surface of the outer limb portion of the elastomeric first annular element, but, preferably, it is secured to the radially outer surface of the inner limb portion. The buffer ring may be formed from material such as nylon, a foam such as polyurethane foam, or rubber reinforced with, for example, steel and may be bonded to the elastomeric first annular element, or as in the case where it is secured to the outer surface of the inner limb portion, it may be compression fitted.

Particularly, but not necessarily only, in constructions where the first annular element is not molded such that the longitudinal axis of the inner and outer rigid members are off-set when said first annular element is in the unloaded condition, the buffer ring may be formed such that its thickness varies around the periphery of the ring such that only when the weight of a shaft or other component is being supported by the resilient bush does the surface of the buffer ring facing one of the rigid members lie uniformly spaced from said one of the rigid members. The invention also provides a shaft assembly comprising a bush having a buffer ring as described and arranged such that under normal load conditions that surface of the buffer ring facing a rigid member is substantially uniformly spaced from said rigid member.

In constructions in which the second annular element extends between the first rigid member and the second rigid member and is formed fo an elastomeric material, said element may be cold bonded to the inner and/or outer rigid members, or may, for example, be molded to a metal ring and compression fitted to one of the rigid members. Furthermore, where the elastomeric material is a foam material the second element may be constructed such that when positioned between the rigid members it is stretched in a circumferential direction around one of the rigid members, and also may be arranged such that it is compressed in a radial direction between the two rigid members. The degree of compression and stretching imposed on the foam when in position between the rigid members may be selected so as to provide the required vibration absorbing characteristics to the final bush and shaft assembly.

The inner rigid member may be substantially solid and arranged to be securable to a supporting or supported component but in the case where the mounting is used as a resilient bush such as for supporting the center bearing of a divided propeller shaft it is preferably of tubular form.

The inner and outer rigid members may extend over the entire axial length of the first annular element and the apex region and area of at least one of the limb portions of the element near the apex region may be so shaped that a substantial amount of relative radial movement between the rigid members is accommodated for by shearing and bending action of the limb portions of the element before it undergoes direct compression. Alternatively, the apex region may be located beyond an outer end of at least one of the rigid members so that the element is again free to accommodate relative radial movement by shearing and bending action of the limb portions of the element.

In operation of a resilient mounting of the kind hereinbefore described and provided with a second annular element in the form of a buffer ring, when used for example as a center bearing mounting for supporting a divided propeller shaft, normal radial forces due to slight out of balance of the shaft are opposed by deformation of the first annular element but in the case of abnormally high radial loads such as occur during orbiting or jack knifing of the propeller shaft the buffer ring will be subjected to compressive forces between the inner and outer rigid members in order to provide adequate resistance to radial forces.

Due, however, to the difference between the circumferences of the peripheries of the surface of the buffer ring and the surface which it contacts when subjected to orbiting or jack knifing movement, the inner and outer rigid members will be urged to rotate or slip relative to each other and the resulting torsional loads to which the first annular element is subjected in resisting such relative rotation will adversely affect the operation life of said elastomeric first annular element.

A further object of the present invention is to provide an improved resilient mounting in which the aforementioned problem is substantially mitigated.

According to a further aspect of the present invention a low friction surface is provided on at least one of the surfaces of the buffer ring and a rigid member which contact each other when the buffer ring is subjected to deformation under relative radial movement between the inner and outer rigid members.

Either the buffer ring or a rigid member may be formed substantially wholly of low friction material, or a low friction surface may be provided by a surface coating or layer of low friction material applied to the buffer ring or a rigid member. Alternatively both contacting surfaces may be of low friction material. The buffer ring may be arranged to be capable of contacting a resilient layer comprising part of the rigid member and this arrangement a low friction surface may be applied to, for example, the resilient portion of the rigid member. A low friction surface coating or layer may be provided by spraying or molding of a low friction material, such as for example nylon or polyurethane. In particular, the low friction surface may be formed by a sprayed coating of polytetrafluoroethylene carried in a polymeric material which produces a fluorocarbon rich surface.

Alternatively a low friction surface may be provided by incorporating into the material of one of the contacting surfaces a liquid material, such as a castor oil which migrates gradually to the contacting surface and remains thereon to act as a lubricant.

The low friction surface should desirably have a coefficient of friction less than 0.50, preferably less than 0.30.

According to another aspect of the present invention in a resilient mounting of the kind hereinbefore described and provided with a second annular element in the form of a buffer ring circumferentially spaced protrusions are formed on at least one of the surfaces which contact each other when the second annular element is subject to deformation under relative radial movement between the inner and outer rigid members.

Preferably the buffer ring is formed integrally with circumferentially spaced protrusions, and particularly where the buffer ring is formed from elastomeric material, said protrusions may be formed integrally from the elastomeric material.

Alternatively, however, the protrusions may be formed on one of the rigid members or may be formed on a portion of the elastomeric first annular element extending substantially axially between the buffer ring and a rigid member.

Preferably the protrusions are deformable and formed with a profile which enables them to flex adequately in a circumferential direction when subjected to torsional loads resulting from relative rotation of the inner and outer rigid members during orbiting or jack knifing, in such a manner that the effective circumference of the surface formed with protrusions equals the circumference of the contacted surface.

Thus, where the protrusions are arranged to extend in a radially outward direction to contact a radially outer surface the tips of the protrusions will increase in spacing when contacting the outer surface so as to increase the effective circumference of the inner surface and enable the protrusions effectively to "walk" on the outer surface.

In alternative arrangements in which the protrusions are arranged to extend in a radially inward direction and to contact a radially inner surface during orbiting, the tips of the protrusions will decrease in spacing when contacting the inner surface so as to decrease the effective circumference of the outer contacting surface and enable the protrusions to "walk" on the inner surface. If desired, the protrusions may be provided with a low friction surface.

Alternatively the protrusions may be formed of a substantially non-deformable material and secured to a base member of deformable material which permits relative movement of the protrusions and enables the tips of the protrusions to walk on the contacted surface in the manner above described.

According to a further aspect of the present invention the second annular element is situated in an annular chamber formed between the first annular element and an annular diaphragm member extending between the inner and outer rigid members.

Preferably the annular chamber is filled with a lubricant to reduce friction between contacting surfaces of the second element and a rigid member during orbiting of jack knifing movement.

The diaphragm member may be formed independent of the first and second annular elements or may be formed integrally with one or both of said elements. The diaphragm member may be formed of a high resilience material so as to provide a slight increase in the radius of fold of the member during relative radial movement between the inner and outer rigid members, as compared with the radius of fold of a low resilience rubber and thereby reduce flexing and heat generation during orbiting or jack knifing.

The annular chamber may be filled substantially wholly with the lubricating fluid and the fluid itself may provide a degree of resistance to relative radial movement between the inner and outer rigid members. Alternatively, only a small proportion of the volume of the annular chamber may be filled with lubricant, and in this case in particular the lubricating fluid may be in the form of a jelly or grease.

The lubricant may be a liquid containing, for example, molybdenum disulphide, or a dispersable graphite powder to increase the lubricating properties of the fluid.

Where lubricant is provided, and the second annular element is in the form of a buffer ring, one of the surfaces which contact during orbiting or jack knifing may be provided with pimples or otherwise roughened to assist in maintaining a film of lubricant between said surfaces when contacting, and thereby reduces the tendency for breakdown of the lubricating film as might otherwise occur between two smooth contacting surfaces.

The pimples may be constituted by the protrusions previously described or the tips of the protrusions may be formed with pimples or otherwise roughened.

While the second annular element, or buffer ring, has been referred to as annular, it is to be appreciated that this refers to the effective shape of the element or ring from a functional aspect in a resilient mounting. In practice the annular element or ring may be constituted by a plurality of segments located around at least a substantial proportion of the circumference of the mounting between the inner and outer rigid members.

Similarly, when protrusions are associated with one of the rigid members they need not extend around the entire periphery or circumference but only around a substantial proportion thereof.

The invention also provides a bearing assembly comprising a resilient mounting as hereinbefore described which may be in combination with a bearing located within a tubular inner rigid member of the resilient mounting.

Several embodiments of the invention will now be described by way of example with reference to the accompanying drawings in which.

Figure 1:
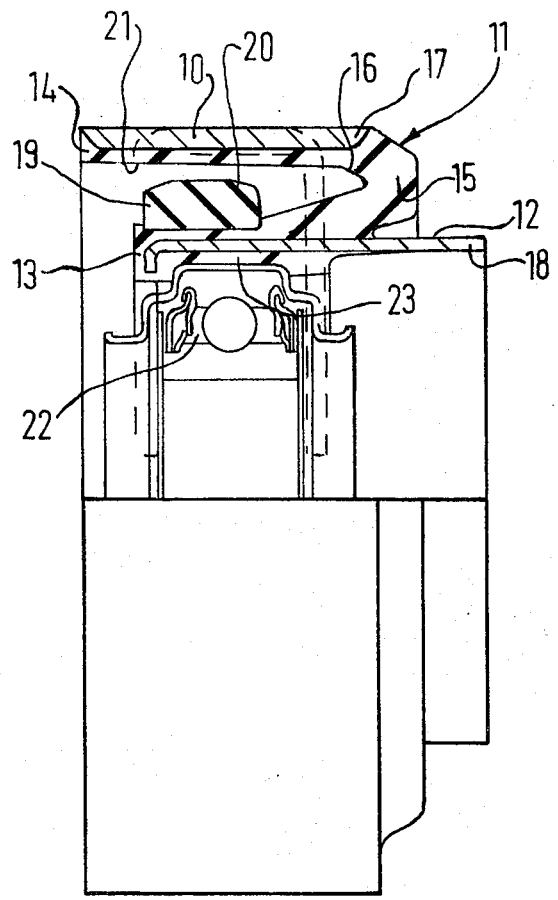
FIG. 1 is a side elevation, half in section, of a ball-bearing assembly together with a resilient bush in accordance with the present invention.

A resilient bush for mounting the center bearing of a vehicle's split propeller shaft to the vehicle body comprises an outer rigid metal support tube 10, a rubber first annular element 11, and an inner rigid metal tube 12 which is partially embedded within a radially inner portion 13 of the rubber element.

The rubber element 11 is of a substantially V-shaped axial cross-section and is disposed relative to the inner and outer tubes such that the two limb portions 13, 14 extend in a substantially longitudinal direction.

The radially outer limb portion 14 is bonded over the greater part of its radially outer surface to the radially inner surface of the outer metal support tube 10, while the apex region 15 at the junction of the limb portions 13, 14 and the part 16 of the outer limb portion adjacent said apex region are situated beyond the one end 17 of the outer support tube.

The radially inner limb portion 13 has the inner metal tube 12 partially embedded therein, with one end 18 of the tube extending from said limb portion past the apex region 15 and spaced therefrom.

An annular buffer ring 19, formed of rubber reinforced with an annular steel band 46 (see FIG. 5), and of uniform cross-sectional shape extends around the inner limb portion 13 of the elastomeric element and is compression fitted thereto. The elastomeric element is molded, as described below, such that under normal static loading of the bush a uniform clearance exists between the radially outer surface 20 of the buffer ring and the radially inner surface 21 of the outer limb portion 14 of the elastomeric element, around the whole periphery. The composition of the material of the buffer ring 19 is selected to provide the desired radial stiffness when in compression in a radial direction.

A propeller shaft center bearing ball race 22 is located within the inner metal tube 12 and is retained in position by compression fitting against that part 23 of the radially inner limb portion of the rubber element lying within the inner metal tube.

Figure 2:
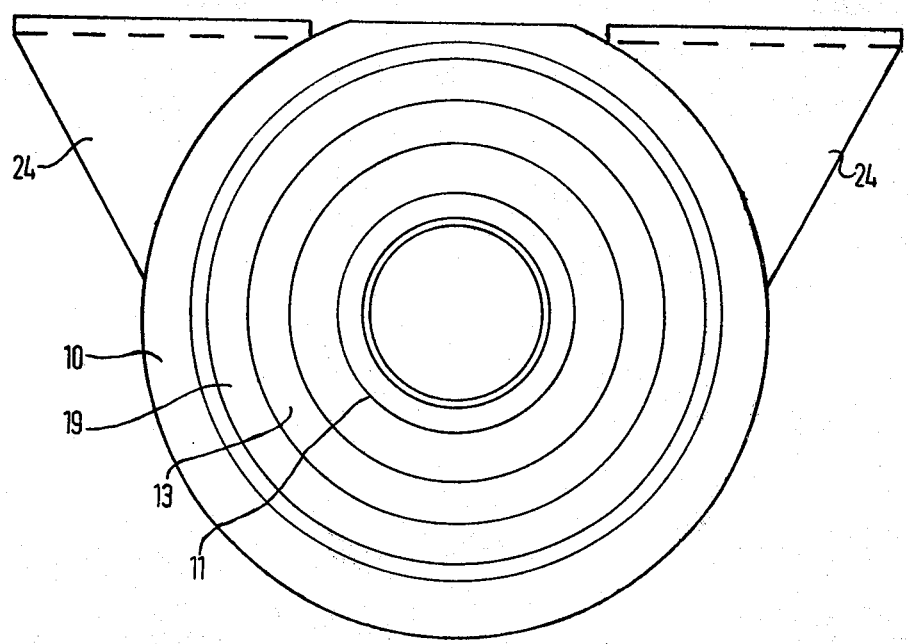
FIG. 2 is an end elevation of the bearing and bush arrangement shown in FIG. 1.

A pair of support arms 24 (see FIG. 2) is attached to the outer metal tube 10 to enable the resilient bush readily to be secured to the vehicle body.

During manufacture of the bush the rubber element 11 is molded with the longitudinal axis of the inner annular limb portion 13 offset relative to the longitudinal axis of the outer annular limb portion 14. The magnitude of the offset is arranged so that, as stated above, the two axes are co-axial under normal static loading of the bush due to the weight of the center bearing and propeller shaft (not shown), and the magnitude is dependent both on the supported weight and the radial stiffness of the rubber element.

In operation of the bush the center bearing 22 of the propeller shaft is normally located centrally within the bush as described in the preceding paragraph and therefore there exists a uniform clearance between the buffer 19 and inner surface 21 of the outer limb portion of the rubber element. During rotation of the propeller shaft a reaction to normal radial forces is provided for by the shearing and bending action of the rubber element 11 and the magnitude of this reaction is substantially independent of radial direction since by virtue of the offset design of the rubber element, under normal static loading, a uniform clearance exists between the buffer ring and rubber element.

When, however, abnormally high radial loads are applied to the center bearing the buffer ring 19 will make contact with the rubber element, thereby increasing the radial spring rate of the bush and further controlling the degree of radial movement of the propeller shaft. The radial stiffness of the rubber element and the clearance between the buffer ring and element will determine the radial force under which they contact and may be arranged so that contact occurs at a desired radial force.

In a second embodiment of the invention (not illustrated) a resilient bush is constructed substantially as described in respect of the preceding embodiment of the invention except that an annular steel band is bonded or pressed to that part of the surface 21 of the outer limb portion 14 opposite the buffer ring 19. The steel band is sufficiently thin as to ensure that an annular clearance exists between the band and buffer ring. The provision of the band ensures that the material of the outer limb portion 14 is protected from scuffing and rubbing such as would otherwise occur during orbiting movement of the buffer ring against the outer limb portion.

The band may alternatively be made of any other abrasion resisting material, for example nylon.

Figure 3:
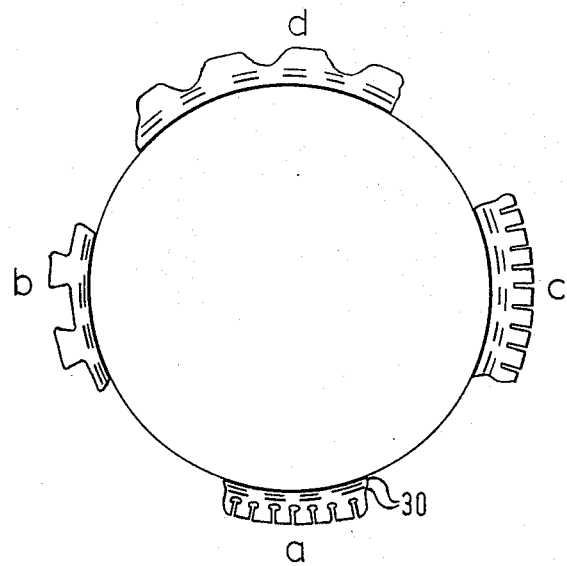
FIG. 3 shows side views of four different forms of protrusions which may be formed on an annular buffer ring.

In a third embodiment of the invention, a resilient bush is constructed substantially as described in respect of the first embodiment of the invention except that the buffer ring is provided with a plurality of circumferentially spaced protrusions in the form of projections. The projections may be formed with undercuts as shown in FIG. 3a, or be of a dovetail shape as shown in FIG. 3b to provide good flexibility in the circumferential direction. Alternatively the projections may be of uniform width as shown in FIG. 3c or a decreasing width away from the base region as shown in FIG. 3d. As illustrated, the buffer ring may be provided with one or more layers 30 of steel reinforcement. Alternatively, other reinforcement materials may be used.

Figure 4:
FIG. 4 shows in cross-section, in a plane containing the longitudinal axis of the buffer ring, various profiles with which the protrusions may be formed.
Figure 6:
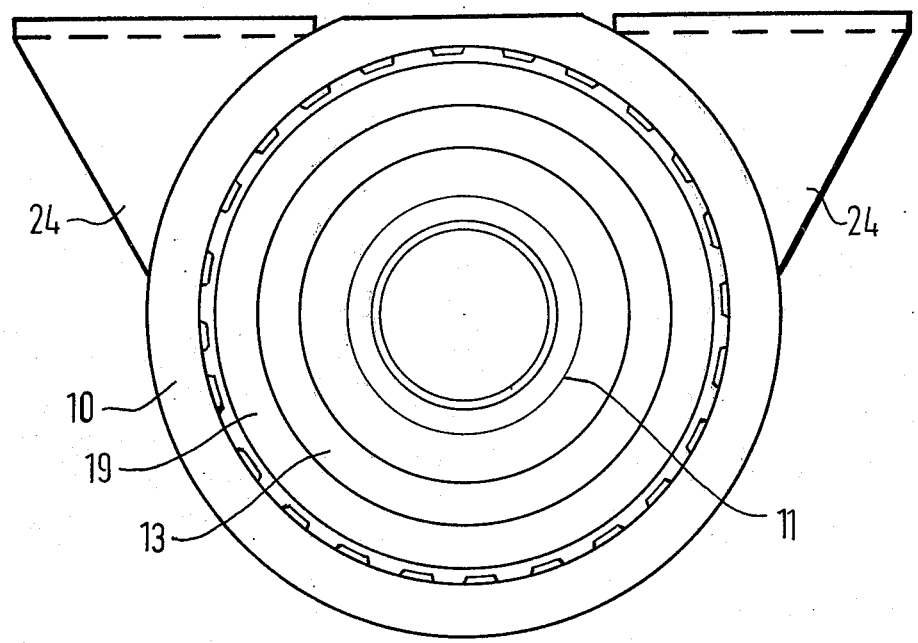
FIG. 6 is an end elevation of the bearing and bush arrangement similar to FIG. 2 but showing another embodiment of the present invention.

The cross-sectional shape of the projections of FIGS. 3a to 3d in a plane containing a longitudinal axis of the bush may be as shown in FIG. 4 or of any other suitable profile. FIG. 6 shows the protrusions formed on one of the rigid members, i.e., support tube 10.

Figure 5:
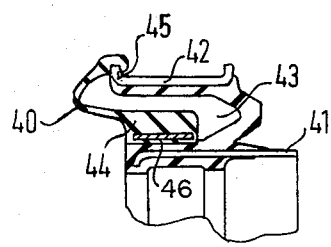
FIG. 5 shows a part sectional elevation of another resilient bush in accordance with the present invention.

In a fourth embodiment of the invention, illustrated in FIG. 5 of the accompanying drawings, a resilient bush is constructed substantially as described in respect of the first embodiment of the invention except that a diaphragm member 40 extends between the inner rigid member 41 and an outer rigid member 42, thereby forming an annular chamber 43 which may contain lubricating fluid. The diaphragm member 40 is formed of a high resilience rubber so as to provide a slight increase in the radius of fold of the member during relative radial movement between the inner and outer members compared with the radius of fold of a low resilience rubber and is formed integrally with the buffer ring 44. The radially outer portion of the diaphragm member 40 is bonded to a lip portion 45 of the outer rigid member 42. As shown in FIG. 5 the band 46 may be molded in the buffer ring so that the ring can be compression fitted over the outer surface of the inner rigid member.

In an alternative construction the buffer ring may be of a foam material.

In a fifth embodiment of the invention a center bearing mounting is again constructed substantially as described in respect of the first embodiment of the invention except that the buffer ring is substituted by an annular element of foam material extending between the limb portions of the elastomeric first annular element so as to leave no gap therebetween.

In normal operation forces in a radial direction will be opposed substantially only by the first annular element with very little resistance from the prestressed foam material, while in the event of orbiting or jack knifing the foam material will be further compressed and thereby provide a substantial increase in radial stiffness.

Furthermore, a particular feature of the use of a second annular element extending between two rigid members is that during orbiting or jack knifing movements there is substantially no sliding movement between two surfaces as in arrangements with a buffer ring and thus there is no requirement to provide low friction surfaces or other means to minimize wear of contacting surfaces.

The use of a resilient bush in accordance with the present invention assists in ensuring that under normal working conditions the noise and vibration of a vehicle propeller shaft are adequately isolated from the vehicle body. Furthermore, under high radial loads such as may be exerted through the bearing during high-torque low-speed conditions, the second annular element restrains radial movement associated with orbiting of the propeller shaft while still providing a considerable degree of noise and vibration isolation.

In addition to providing a uniform radial clearance and substantially uniform radial stiffness the use of an elastomeric element which is offset in an unloaded condition has the advantage of reducing stress concentrations within the bush during normal service.

Having now described our invention, what we claim is:

1. Resilient mounting comprising: an outer rigid member defining an aperture, an inner rigid member situated in said aperture so that the two rigid members define an annular space therebetween, a deformable first annular element located in said annular space and extending between and bonded to the inner and outer rigid members, and an annular buffer ring of deformable material located between and secured to at least one of said inner and outer rigid members wherein the improvement comprises a substantially inextensible reinforcement associated with the buffer ring which compresses an inner layer of resilient material between the reinforcement and the rigid member to which it is secured so that the buffer ring is secured by the action of compression forces in the inner layer of resilient material, the material of the buffer ring having a resilience different from that of the material of the deformable first annular element, and wherein said annular buffer ring is continuous in a circumferential direction and of a cross-sectional shape such that it resists any substantial deformation by bending in a plane containing the axis of the mounting.

2. A mounting according to claim 1 wherein the material of the deformable first annular element is arranged to accommodate said relative radial movement by shearing and bending action.

3. A mounting according to claim 1 wherein the deformable first annular element is of substantially V-shaped axial cross-sectional shape.

4. A mounting according to claim 3 wherein the disposition of the first annular element between the rigid members is such that two limb portions of the cross-sectional shape extend substantially parallel with the direction of the longitudinal axis of said annular element.

5. A mounting according to claim 4 wherein at least one of the two limb portions is in contact with one of the rigid members over only that area of the limb portion substantially remote from an apex region at the junction of the two limb portions.

6. A mounting according to claim 5 wherein the apex region is located beyond an outer end of at least one of the rigid members.

7. A mounting according to claim 6 wherein the deformable first annular element is formed from elastomeric material.

8. A mounting according to claim 6 wherein the buffer ring is formed of nylon.

9. A mounting according to claim 6 wherein the buffer ring is formed of an elastomeric material.

10. A mounting according to claim 6 wherein the buffer ring is formed of a foam material.

11. A mounting according to claim 1 wherein when the deformable first annular element is in an unloaded condition the longitudinal axis of the inner rigid member is offset relative to that of the outer rigid member.

12. A mounting according to claim 1 wherein the thickness of the buffer ring varies around the periphery of the ring so that when subjected to a load acting in a radial direction a uniform spacing may exist between the buffer ring and one of the rigid members.

13. A mounting according to claim 1 wherein at least one of the surfaces of the buffer ring and a rigid member which contact each other when the annular element is subjected to deformation under relative radial movement between the inner and outer rigid members has a low-friction surface.

14. A mounting according to claim 1 wherein circumferentially-spaced protrusions of deformable material are formed on at least one of the surfaces which contact each other when the buffer ring is subject to deformation under relative radial movement between the inner and outer rigid members.

15. A mounting according to claim 14 wherein the buffer ring has integrally formed circumferentially-spaced protrusions.

16. A mounting according to claim 14 wherein the protrusions are formed on one of the rigid members.

17. A mounting according to claim 1 wherein that surface contacted by the buffer ring when subject to relative radial movement between the inner and outer rigid members comprises a band of abrasion resistant material.

18. A mounting according to claim 17 wherein the buffer ring is formed from foam material.

19. A mounting according to claim 1 wherein the material of the buffer ring is pre-stressed.

20. A mounting according to claim 1 wherein the buffer ring is situated in an annular chamber formed between the first annular element and an annular diaphragm member extending between the inner and outer rigid members.

21. A mounting according to claim 20 wherein the annular chamber is filled with a lubricant.

22. A mounting according to claim 20 wherein the diaphragm member is formed independent of the first and second annular elements.

23. A mounting according to claim 20 wherein the diaphragm member is formed integrally with at least the first annular element.

24. A mounting according to claim 20 wherein the buffer ring has pimples or roughened areas on at least one of its surfaces which may contact another surface when the buffer ring is subject to deformation under relative radial movement between the inner and outer rigid members.

25. A mounting according to claim 1 wherein the buffer ring comprises a plurality of individual segments located around at least a substantial proportion of the periphery of the mounting, between the inner and outer rigid members.

26. The mounting of claim 1 in which the inner layer of resilient material is part of the buffer ring.

27. The mounting of claim 1 in which the inner layer of resilient material is an axially extending portion of the deformable first element.

* * * * *

UNITED STATES PATENT AND TRADEMARK OFFICE
CERTIFICATE OF CORRECTION

PATENT NO. : 3,961,829
DATED : June 8, 1976
INVENTOR(S) : Gwynne BOWEN et al

It is certified that error appears in the above-identified patent and that said Letters Patent are hereby corrected as shown below:

Item [30] Foreign Application Priority Data should read as follows:

--- September 20, 1972   United Kingdom ...... 43528/72

May 5, 1973          United Kingdom ...... 21521/73 ---.

Signed and Sealed this

Seventeenth Day of August 1976

[SEAL]

Attest:

RUTH C. MASON
*Attesting Officer*

C. MARSHALL DANN
*Commissioner of Patents and Trademarks*